United States Patent [19]

Gioffre et al.

[11] Patent Number: 4,855,154

[45] Date of Patent: Aug. 8, 1989

[54] PROCESS FOR DEODORIZING MARINE OILS

[75] Inventors: Anthony J. Gioffre, Ridgefield, Conn.; Bonita K. Marcus, Rye, N.Y.

[73] Assignee: UOP, Des Plaines, Ill.

[21] Appl. No.: 206,276

[22] Filed: Jun. 14, 1988

Related U.S. Application Data

[63] Continuation-in-part of Ser. No. 67,997, Jun. 30, 1987, Pat. No. 4,795,482.

[51] Int. Cl.$^4$ ............................. A23D 5/02; C09F 5/10
[52] U.S. Cl. ............................. 426/417; 208/DIG. 2; 260/428; 426/423
[58] Field of Search ..................... 208/310 Z, DIG. 2; 210/673, 691; 260/428, 428.5; 423/32 B; 426/417, 422, 423; 502/60, 65, 68

[56] References Cited

U.S. PATENT DOCUMENTS

| | | | |
|---|---|---|---|
| 3,954,819 | 5/1976 | Husch | 426/417 X |
| 3,976,671 | 8/1976 | Husch | 426/417 X |
| 3,984,447 | 10/1976 | Cooper et al. | 426/417 X |
| 4,061,724 | 12/1977 | Grose et al. | 423/335 |
| 4,112,129 | 9/1978 | Duensing et al. | 426/417 |
| 4,284,580 | 8/1981 | Logan et al. | 260/428.5 |
| 4,297,335 | 10/1981 | Lok et al. | 502/60 X |
| 4,329,280 | 5/1982 | Cleary et al. | 260/428.5 X |
| 4,330,564 | 5/1982 | Friedman | 426/423 X |
| 4,331,694 | 5/1982 | Izod | 426/422 |
| 4,404,145 | 9/1983 | Cleary et al. | 260/428.5 X |
| 4,437,429 | 3/1984 | Goldstein et al. | 119/1 |
| 4,443,379 | 4/1984 | Taylor et al. | 502/65 X |
| 4,499,196 | 2/1985 | Yuki | 426/417 X |
| 4,503,023 | 3/1985 | Breck et al. | 502/60 X |
| 4,519,952 | 5/1985 | Cleary et al. | 260/428.5 X |
| 4,522,761 | 6/1985 | Cleary et al. | 260/428.5 X |
| 4,524,029 | 6/1985 | Cleary et al. | 260/428.5 X |
| 4,524,030 | 6/1985 | Cleary et al. | 260/428.5 X |
| 4,529,551 | 7/1985 | Cleary et al. | 260/428.5 X |
| 4,629,588 | 12/1986 | Welsh et al. | 260/428 |
| 4,648,977 | 3/1987 | Garg et al. | 210/673 |
| 4,681,768 | 7/1987 | Mulflur et al. | 426/417 |
| 4,701,438 | 10/1987 | Taylor et al. | 426/423 X |
| 4,734,226 | 3/1988 | Parker et al. | 426/417 X |
| 4,735,815 | 4/1988 | Taylor et al. | 426/417 |
| 4,764,384 | 8/1988 | Gyann | 426/417 |

FOREIGN PATENT DOCUMENTS

13451 7/1980 European Pat. Off. ............ 426/423

*Primary Examiner*—Robert Spitzer
*Attorney, Agent, or Firm*—Thomas K. McBride

[57] ABSTRACT

Marine oils are deodorized by contact with an effective amount of crystalline siliceous molecular sieves having strongly organophilic properties and pore diameters of at least 5.5 Angstroms. The molecular sieves selectively adsorb odorous organic amines and other odor-producing molecular species, such as aldehydes and ketones, without alteration of the essential unsaturated fatty acid triglycerides.

14 Claims, No Drawings

PROCESS FOR DEODORIZING MARINE OILS

RELATED APPLICATIONS

This application is a continuation-in-part of application Ser. No. 067,997, filed June 30, 1987, now U.S. Pat. No. 4,795,482 issued Jan. 3, 1989.

FIELD OF THE INVENTION

The present invention relates in general to the deodorization of marine oils, and more particularly to the process for deodorizing marine oils by contact with a crystalline molecular sieve having certain critical -physical and chemical properties hereinafter elucidated.

DESCRIPTION OF THE PRIOR ART

Virtually all vegetable oils used as food or in the preparation of food are subjected to a deodorizinq treatment to reduce undesirable odors or tastes which are either present in the oil in its natural state or imparted thereto by the various extraction or processing procedures employed. A rare exception is olive oil in which the natural flavor and odor are universally found to be highly desirable. The identification of the various molecular species which contribute to odors in fats and oils is by no means complete, but certainly include some of the ketones, aldehydes and aliphatic acids which are constituents of many compositions generally perceived as malodorous. These odor-causing substances are usually present in fats and oils in amounts of less than 0.1 percent of the total weight of the oil.

In the overwhelming majority of cases, the oil deodorizing process is a steam distillation process wherein the relatively non-volatile oil is stripped of the relatively volatile constituents at high temperature and under reduced pressure. A rather drastic treatment of this type is required to produce a satisfactory bland and low odor oil product, with large volumes of steam at temperature as high as 250° C. being commonly utilized. In addition, the presence of oxygen must be rigorously avoided to prevent the production of free fatty acids which also impart an undesirable odor to edible oils. Metallic contamination of the oil being treated at high temperatures must also be guarded against.

It has also been proposed to use to treat oils and fats which have been used in fast food frying to reduce their content of degradation and oxidation products, principally free fatty acids, to enable their reuse without imparting a serious degree of off-flavor to the processed food. Such adsorbents include clays, magnesium silicates, zeolites, activated alumina and activated carbon. As reported in U.S. Pat. No. 4,735,815 however, none of these adsorbents is fully efficacious for the rejuvenation of used frying oils and, in fact, the more acidic, i.e. catalytic, of these adsorbents, which include zeolites, actually generate free fatty acids. A particular combination of acid activated clay or magnesium silicate with a gel-derived alumina (such as pseudo-boehmite) is alleged by the patentees of U.S. Pat. No. 4,735,815 to produce improved results. Also in U.S. Pat. No. 4,443,379 it is reported that a mixture consisting essentially of a major proportion of bleaching clay and a minor proportion of an aluminosilicate zeolite of the faujasite structure. i.e. zeolite or zeolite Y is useful in deodorizing edible oils and the removal of free fatty acids. A similar process for removing free fatty acids from either crude or used edible oils is described in U.S. Pat. No. 3,954,819 in which zeolites alone or in combination with filtering aids are employed.

In general, when zeolites have been utilized for odor suppression, the preferred species have been those with a low framework Si/Al ratio and a high degree of adsorption capacity for water or other highly polar molecules such as ammonia or hydrogen sulfide. The disclosure of the aforesaid U.S. Pat. No. 4,437,429 is somewhat remarkable for its specific disclosure of many of the class of so-called high silica zeolites which are synthesized using organic templating agents such as the tetraalkylammonium ions. These include ZSM-5, ZSM-11, ZSM-12 and ZSM-23. The preferred zeolite species is the natural mineral clinoptilolite, however, which has a nominal framework $SiO_2/Al_2O_3$ molar ratio of about ten. It has also been proposed, U.S. Pat. No. 4,648,977, to use high-silica molecular sieves, including the silica polymorph silicalite, to adsorb toxic organic materials, including mercaptans, from aqueous media for water purification purposes.

Of the edible oils, marine oils constitute only a small fraction of the total human consumption, despite what appear to be the obvious health advantages attributable to a relatively high proportion of unsaturated fatty acids, present as triglycerides. This under-utilization is due primarily to presence of the strong characteristic "fishy" odor present in all such oils. In large part this odor is attributable to amine compounds, particularly trimethylamine. Also, the presence in fish oil and other marine oils of triglycerides of highly unsaturated acids (four or more double bonds) render these oils prone to easy development of rancidity by oxidative reactions. The highly unsaturated nature of the fatty acids present in marine oils makes conventional steam distillation types of deodorization processes virtually impractical of application.

The Present Invention

It has now been discovered that marine oils can be deodorized by the removal of organic amines and other organic odor-causing constituents by contacting same at a temperature within the range of $-20°$ C. to 200° C. preferably 10° C. to 100° C., with a crystalline siliceous molecular sieve in which at least about 90, and preferably at least about 95 percent of the framework tetrahedral oxide units are $SiO_2$ tetrahedra and which have a sorptive capacity for water at 25° C. and 4.6 torr of less than 10 weight percent. In the case of aluminosilicate molecular sieves, those useful in the practice of the invention have a framework $SiO_2/Al_2O_3$ molar ratio of from about 35 to infinity, and preferably from 200 to 500. All of the siliceous molecular sieves suitably employed have a pore diameter of at least 5.5 Angstroms, preferably at least 6.2 Angstroms. Preferably the adsorption capacity for water vapor at 25° C. and a water vapor pressure $(p/p_o)$ of 4.6 torr is less than 6 weight percent. The efficacy of the molecular sieves employed in the practice of the present invention is not dependent upon the presence of the water of hydration present in the internal cavities of the microporous structure as a result of their hydrothermal formation. In fact, at least a major proportion, usually substantially all, of this original water of hydration is removed in the process of removing any pore-blocking templating agent which may be present in the adsorbent. Calcination effectively removes the organic moieties. Also, water washing or washing with a caustic or dilute mineral acid solution is advantageously utilized to remove extraneous synthesis reagents from the pore system. Lowering of the alkali metal content, particularly the non-zeolitic, i.e., occluded alkali metal compounds can also be beneficial. These procedures also serve to remove the original water of hydration.

The siliceous molecular sieves suitably employed in the practice of the invention include the microporous crystalline aluminosilicates, i.e. the zeolitic molecular sieves as well as the so-called silica polymorphs. With respect to the latter compositions, their crystal lattices are ideally formed entirely of $SiO_2$ tetrahedral units but the as-synthesized forms commonly contain at least trace amounts of aluminum derived from aluminum impurities in the synthesis reagents. The aluminosilicate molecular sieves comprise the large class of well-known crystalline zeolites. These high-silica molecular sieves are either commercially available or are prepared by methods, well-known in the art, involving direct hydrothermal synthesis or involving certain types of crystal lattice dealuminations. A comprehensive review article by E. M. Flanigen concerning both "high" Si/Al zeolites and silica molecular sieves is published in "Proc. 5th Int. Conf. Zeolites, Naples, 1980", L.V.C. Rees, ed., Heyden, London, pp. 760–780. This article is incorporated herein by reference.

It is a critical aspect of the present invention that the adsorptive capacity for water of the siliceous molecular sieve is less than 10 weight percent and preferably less than 6 weight percent when measured at 25° C. and a water vapor pressure ($p/p_o$) of 4.6 torr. It is another critical aspect that the number of $AlO_2$ tetrahedral units of the crystal lattice, if present at all, be very small compared with the number of $SiO_2$ tetrahedral units. It has been observed that there appears to be some correlation between the framework $SiO_2/Al_2O_3$ ratio and the adsorptive capacity for water, i.e., the so-called hydrophobicity, of siliceous molecular sieves. While many molecular sieves with framework $SiO_2/Al_2O_3$ molar ratios of greater than about 18, and especially greater than about 35, exhibit the requisite degree of hydrophobicity for use in the present invention, some do not. Many of the synthetic zeolites prepared using organic templating agents are readily prepared in a highly siliceous form—some even from reaction mixtures which have no intentionally added aluminum. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. Nos. 4,061,724 and 4,073,865, respectively. To the extent the aforesaid siliceous sieves are synthesized to have $SiO_2/Al_2O_3$ ratios greater than 35, they are frequently suitable for use in the present process without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High-temperature steaming procedures for treating zeolite Y which result in hydrophobic product forms are reported by P. K. Maher et al., "Molecular Sieve Zeolites," Advan. Chem. Ser. 101, American Chemical Society, Washington, D.C. 1971, p. 266. A more recently reported procedure applicable to zeolite species generally, involves dealumination and the substitution of silicon into the dealuminated lattice site. This process is disclosed in U.S. Pat. No. 4,503,023 issued Mar. 5, 1985 to Skeels et al. Halogen or halide compound treatments for zeolites to increase their hydrophobicity are disclosed in U.S. Pat. No. 4,297,335.

With respect to the foregoing adsorbents, it is important that the pore system be open so that the internal cavities of the crystals be accessible to the odor molecules. In the case of the aluminosilicates or silica polymorphs produced using large organic templating ions such as tetraalkylammonium ions, it is necessary to remove charge-balancing organic ions and any occluded templating material in order to permit adsorption of the odor molecules. In such a removal process and also in the removal of inorganic debris, the original water of hydration is also removed. Upon exposure to the atmosphere a portion of the water of hydration is reacquired, but this does not affect the characteristics of the molecular sieve which are essential for the practice of the present invention, i.e. the molecular sieve can be employed in either a hydrated or dehydrated state, but in general the dehydrated state is preferred. In the case of most of the dealumination procedures referred to above, the original water of hydration is also removed, and can similarly be replaced, if desired, for the practice of this invention.

It should be pointed out that it is the framework $SiO_2/Al_2O_3$ ratio which is important. This is not necessarily the same ratio as would be indicated by conventional wet chemical analysis. Especially is this the case when dealumination is accomplished by high temperature steaming treatments wherein aluminum-containing tetrahedral units of the zeolite are destroyed., but the aluminum values remain, at least in part, in the zeolite crystals. For such zeolite products resort must be had to other analytical methods such as x-ray and NMR. One such steam treated zeolite Y composition, denominated LZ-10, has been found to be particularly useful in the practice of the present process, especially when utilized in combination with the silica polymorph silicalite. The process for preparing LZ-10 is described in detail in U.S. Pat. No. 4,331,694 and in application Ser. No. 880,561 filed Feb. 23, 1978. A benefit appears to be obtained by such a combination of molecular sieves in all proportions, but each type of adsorbent is preferably present in an amount of at least 10 per cent based on the total weight of the two adsorbents (hydrated weight basis).

The odorous organic compounds suitably removed from marine oils in accordance with the present invention can be any organic molecular species having a vapor pressure at 23° C. of greater than 1 mm Hg. It has been observed that many of the compounds having the more objectionable odors, when added to liquid water lower the surface tension thereof. These compounds are a preferred class of odor-causing materials for removal from marine oils in accordance with the present invention. The process is of particular advantage in removing organic compounds of the following subgeneric classes:

(a) saturated or unsaturated aliphatic acids and aldehydes containing a single —COOH or —CHO group and containing less than 12 carbon atoms, such as butyric, valeric, isovaleric (alpha-methylbutyric), capric and caprylic acids; and (b) organic nitrogen-containing compounds in which the valence of the nitrogen atom is 3, such as the aliphatic amines of the general formula R₂NR' wherein R is hydrogen or R' and R' is an alkyl or alkenyl group having from 1 to 6 carbon atoms; and the heterocyclic nitrogen compounds containing an imino group in which the nitrogen atom is a part of the heterocyclic ring.

Of the compounds within these subgeneric classes, trimethyl amine and isovaleric acid, are both normal constituents of marine oils, particularly fish oils and together constitute a significant source of odor in crude marine oil. It will be understood, however, that in handling, treatment and storing of marine oils a broad spectrum of odor-causing compounds can be imparted. The mineral elements calcium, copper, iron, magnesium, phosphorus, potassium, sodium, chlorine, sulfur, fluorine, iodine and arsenic are all present in marine oils either as salts or as a constituent of complex orqanic species. Some of these are odor-causing and others can be readily converted to odor-causing molecular species. Accordingly, the spectrum of odorous materials which can be removed from marine oils by the present process is very large. It is not necessary, however, that each and every odorous molecular species present be totally removed by the present process since some odors may not be objectionable and it may be the case that even objectionable odors need only be reduced rather than eliminated for certain applications. In general the degree of odor removal is a function of the proportions of molecular sieve adsorbent, and it is possible t regulate the degree of odor removal by regulating the proportions of molecular sieve and marine oil, and/or by regulating the period of contact of the oil with the adsorbent. Preferably sufficient molecular sieve is brought into contact with the marine oil being treated to eliminate at least the odor attributable to one molecular species such as trimethyl amine or isovaleric acid. For successful elimination of an odor, it is essential to effectively isolate the source molecules to a level beneath their detection threshold, which in almost all instances is an extremely low concentration level of 0.00000004 mg./liter of air. Since an ordinary "sniff" involves a quantity of ambient atmosphere of about 50 cc., it becomes apparent that a total amount of such a mercaptan which can be detected by the human sense of smell is only about 0.000000002 mg. Quantities this small exceed the analytical capability of essentially all types of test apparatus, including the gas chromatograph. Nowhere in the prior art has it been suggested that molecular sieve adsorbents are capable of such a degree that residual concentrations over the adsorbent are below the detection threshold.

Accordingly, it is apparent that much more than organophilic selectivity is involved in the present process. Without wanting to be bound by any particular theory or theories, it is believed likely that one or more of the following phenomena are involved. One prospect is that a catalytic process is involved whereby the odor molecules are reacted inter se or with other available molecular species such as oxygen to form compounds or polymers which no longer stimulate the olfactory receptors. It is known that high molecular weight organic molecules are significantly less odorous than low molecular weight molecules of similar atomic content and structure; n-decyl and lauryl mercaptans have no more odor than their corresponding alcohols. Thus, polymerization or condensation reactions could be beneficial in the present process. It is another possibility that the adsorption isotherms for the odor molecules for the very highly siliceous zeolite adsorbents involved here have steeper slopes in the region of very low adsorbate partial pressures than has heretofore been appreciated. Since the partial pressure of odor molecules often encountered are frequently quite low, the high silica adsorbents would exhibit superior adsorptive performcance for that reason. Still another factor may be van de Waals interactions between the odor molecules and the molecular sieve causing the odor molecules to be tightly bound and trapped within the adsorbent. There may also be a coadsorption of two or more different odor molecules resulting in a symergysm that eliminates the odors of both.

The marine oils suitably treated by the present process include not only the oil from small oily fishes such as California sardine (pilchard), menhaden and herring but also whale oil and fish liver oil derived from a large variety of fishes including soupfin shark, grayfish, halibut, sablefish, lingcod, tuna and cod. Fish liver oil is marketed largely as a vitamin diet supplement whereas the fish oils are commercially utilized in food processing, as drying oils and, in the hydrogenated form, in the manufacture of metallic soaps. Marine oils are characterized by a large content of fatty acids of various chain lengths above and below $C_{18}$, the unsaturated species of which can contain up to seven double bonds. Palmitoleic (physetoleic) acid and oleic and vaccenic acids, the latter two being isomeric forms of octadecenic acid, are major unsaturated fatty acid constituents of marine animal oils. Gadoleic and eicosadienoic acids are widespread in the oils of most marine species but are usually minor constituents. Of the saturated fatty acids, palmitic and stearic acids are both widely distributed and generally present in large amounts. Palmitic acid can be present in shark-liver oil in amounts as great as 4% percent. Isovaleric acid is unique in being the only branched-chain acid and the only acid with an odd number of carbon atoms known to occur in marine animal oils. A more detailed discussion of the composition of marine oils is found in Encyclopedia of Chemical Technology, Volume 6, Kirk, R. E. and D. F. Othmer (The Interscience Encyclopedia, Inc., New York (1951), particularly at pages 283–286 and pages 570–577, the disclosure of which is incorporated herein by reference.

The method for contacting the marine oil with the siliceous molecular sieve adsorbent is not narrowly critical. Batch operations in which the molecular sieve powder is simply added to the marine oil to be treated, preferably with stirring or mixing, has been found to be satisfactory. For larger scale operations, the oil can be passed, in the liquid phase, through an adsorbent bed containing the essential siliceous crystalline molecular sieve adsorbent, whereby the odorous constituents are selectively removed on the adsorbent, and the deodorized oil product recovered as the bed effluent. Periodically the adsorbent can be regenerated by conventional means such as steam purging. The siliceous molecular sieve can be present in a formulation with diluents, carriers, binders and the like, and be in the form of a powder, an agglomerate or monolith.

Temperature conditions at contact are not critical, but are preferably within the range of 10° to 100° C., i.e. the ambient atmospheric temperature occurring in any season and in any geographical location. Pressure is also not a critical factor, but is preferably at least about one atmosphere.

What is claimed is:

1. Process for removing an existing odor from a marine oil due to the presence of isovaleric acid or at least one organic amine molecular species which comprises contacting said marine oil and adsorbing said isovaleric acid or organic amine molecular species at a temperature within the range of $-20°C$. to $200°C$. with a crystalline siliceous molecular sieve adsorbent which has been at least partially activated, in which at least about 90 percent of the framework tetrahedral oxide units are $SiO_2$ tetrahedra, which has pore diameters of at least 5.5 Angstroms and has a capacity for adsorbed water of not greater than 10 weight percent when measured at $25°C$. and at a water vapor pressure of 4.6 torr, said contacting and adsorbing of said isovaleric acide or organic amine molecular species being to such a degree that residual concentrations thereof over the adsorbent are below the detection threshold of the human sense of smell.

2. Process according to claim 1 wherein the crystalline siliceous molecular sieve contains less than 0.2 weight percent alkali metal on an anhydrous basis.

3. Process according to claim 1 wherein the crystalline siliceous molecular sieve has a capacity for adsorbed water of not greater than 6 weight percent.

4. Process according to claim 3 wherein the siliceous molecular sieve is a silica polymorph.

5. Process according to claim 1 wherein the crystalline siliceous molecular sieve is an aluminosilicate having a framework $SiO_2/Al_2O_2$ molar ratio greater than 35.

6. Process according to claim 5 wherein the aluminosilicate has a $SiO_2/Al_2O_2$ molar ratio of from 200 to 500.

7. Process according to claim 1 wherein the siliceous molecular sieve comprises a mixture of a silica polymorph and an aluminosilicate having a framework $SiO_2/Al_2O_2$ ratio of from 200 to 500.

8. Process according to claim 1 wherein the organic molecular species has a vapor pressure at $23°$ C. of greater than 1 mm. Hg and which when added to liquid water lowers the surface tension thereof.

9. Process according to claim 1 wherein the marine oil is fish oil.

10. Process according to claim 1 wherein the marine oil is liver oil.

11. Process according to claim 1 wherein the organic amine molecular species is an alkylamine.

12. Process according to claim 11 wherein the alkylamine is trimethylamine.

13. Process according to claim 1 wherein the existing odor is due to the presence of isovaleric acid.

14. Process according to claim 1 wherein the temperature range is $10°$ C. to $100°$ C.

* * * * *